(12) United States Patent
Grim et al.

(10) Patent No.: US 11,150,495 B2
(45) Date of Patent: Oct. 19, 2021

(54) STRAIN TUNING INDIVIDUAL QUANTUM DOT EMISSION FREQUENCIES WITH LOCAL PHASE TRANSITIONS

(71) Applicant: The Government of the United States of America, as represented by the Secretary of the Navy, Arlington, VA (US)

(72) Inventors: Joel Q. Grim, Washington, DC (US); Allan S. Bracker, Alexandria, VA (US); Samuel Carter, Waldorf, MD (US); Daniel Gammon, Waldorf, MD (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 74 days.

(21) Appl. No.: 16/421,778

(22) Filed: May 24, 2019

(65) Prior Publication Data

US 2019/0369420 A1 Dec. 5, 2019

Related U.S. Application Data

(60) Provisional application No. 62/678,532, filed on May 31, 2018.

(51) Int. Cl.
*G02F 1/017* (2006.01)
*C01G 27/02* (2006.01)

(52) U.S. Cl.
CPC ......... *G02F 1/01716* (2013.01); *C01G 27/02* (2013.01); *G02F 1/01766* (2021.01); *G02F 1/01791* (2021.01)

(58) Field of Classification Search
CPC ............. G02F 1/01716; G02F 1/01766; G02F 1/01791; C01G 27/02; H01L 33/06;
(Continued)

(56) References Cited

U.S. PATENT DOCUMENTS

2009/0045317 A1* 2/2009 Fushman ............. G02B 6/4222
250/201.1
2010/0270481 A1* 10/2010 Wong .................. G02B 6/12007
250/503.1

(Continued)

FOREIGN PATENT DOCUMENTS

WO 2018-086114 5/2018

OTHER PUBLICATIONS

Chen et al., "Spatially Selective Optical Tuning of Quantum Dot Thin Film Luminescence," J. Am. Chem. Soc. 2009, 131, p. 18204-18205. (Year: 2009).*

(Continued)

*Primary Examiner* — Benjamin Tzu-Hung Liu
(74) *Attorney, Agent, or Firm* — US Naval Research Laboratory; Roy Roberts (57) ABSTRACT

A technique is described to deterministically tune the emission frequency of individual semiconductor photon sources, for example quantum dots. A focused laser is directed at a film of material that changes form when heated (for example, a phase change material that undergoes change between crystal and amorphous forms) overlaid on a photonic membrane that includes the photon sources. The laser causes a localized change in form in the film, resulting in a change in emission frequency of a photon source.

9 Claims, 7 Drawing Sheets

(58) Field of Classification Search
CPC ....... H01L 33/005; H01L 33/26; H01L 33/16; H01L 33/44; H01S 5/34
See application file for complete search history.

(56) References Cited

U.S. PATENT DOCUMENTS

| | | | |
|---|---|---|---|
| 2012/0076166 A1* | 3/2012 | Schliwa | H01L 33/06 372/45.011 |
| 2016/0258807 A1* | 9/2016 | Pein | G01J 5/046 |
| 2017/0085212 A1 | 3/2017 | Shaner et al. | |
| 2019/0131425 A1* | 5/2019 | Lu | H01L 29/516 |

OTHER PUBLICATIONS

Timothy M. Sweeney et al. Cavity-stimulated Raman emission from a single quantum dot spin. In: Nature Photonics, 2014, vol. 8, pp. 442-447.

Patrick M. Vora et al. Spin-cavity interactions between a quantum dot molecule and a photonic crystal cavity. In: Nature Communications. 2015, vol. 6, Article No. 7665, pp. 1-3.

International Search and Opinion dated Apr. 23, 2020 in PCT/US2019/033892.

\* cited by examiner

STRAIN TUNING INDIVIDUAL QUANTUM DOT EMISSION FREQUENCIES WITH LOCAL PHASE TRANSITIONS

CROSS-REFERENCE TO RELATED APPLICATIONS

This application claims the benefit of U.S. Provisional Patent Application No. 62/678,532 filed on 31 May 2018, the entirety of which is incorporated herein by reference.

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, D.C. 20375, USA; +1.202.767.7230; techtran@nrl.navy.mil, referencing NC 107171.

BACKGROUND

Single photon emitters (SPEs) are a central component of photonic quantum information (QI) technologies such as quantum computing, communication, and sensing. Quantum information protocols require large numbers of quantum bits (qubits), which has motivated the development of solid-state SPEs. InAs/GaAs semiconductor quantum dots (QDs) are presently viewed as the best-performing solid-state SPEs, with record generation rates and high single photon purity.

Generating indistinguishable photons is an essential capability for QI technologies, but this is the most significant fundamental challenge for solid-state SPEs due to uncontrolled frequency variation from emitter to emitter. Overcoming this challenge for QDs would be a critical advance for quantum information technologies A need exists for a technique to tune solid-state quantum emitters to particular frequencies.

BRIEF SUMMARY

Described herein is a technique to deterministically tune the emission frequency of individual semiconductor photon sources, such as quantum dots. This capability solves a major challenge for photonic information processing, and is expected to enable scalable on-chip photonic networks that can be used for photonic computing, communication, and sensing.

In one embodiment, a method of tuning quantum emitters includes providing a photonic membrane diode comprising a plurality of solid-state quantum emitters; depositing a film of material on the photonic membrane diode, wherein the film undergoes a change in form upon heating; and focusing a spot of laser light on the film with power sufficient to induce the change in form in the film, wherein the change in form causes a change in emission frequency of at least one of the plurality solid-state quantum emitters.

In another embodiment, a method of tuning quantum emitters includes providing a photonic membrane diode comprising a plurality of solid-state quantum emitters and a film of material overlaid on the photonic membrane diode, wherein the film undergoes a change in form upon heating; focusing a spot of laser light on the film with power sufficient to induce the change in form in the film, wherein the change in form causes a change in emission frequency of at one of the plurality solid-state quantum emitters.

A further exemplary embodiment is now described. First, a photonic membrane diode with embedded solid-state emitters (for example, quantum dots) is fabricated or obtained. Then a thin film of material that changes form when heated (for example, a phase change material that undergoes change between crystal and amorphous forms) is deposited on the photonic membrane. Next, a laser light is focused to a ~1 μm (or larger) spot with a power sufficient to induce a local phase transition in the thin film. Repeated exposures can result in a larger fraction of the thin film to undergo a phase transition, resulting in progressively larger strain, shifting the QD energy.

DETAILED DESCRIPTION

Definitions

Before describing the present invention in detail, it is to be understood that the terminology used in the specification is for the purpose of describing particular embodiments, and is not necessarily intended to be limiting. Although many methods, structures and materials similar, modified, or equivalent to those described herein can be used in the practice of the present invention without undue experimentation, the preferred methods, structures and materials are described herein. In describing and claiming the present invention, the following terminology will be used in accordance with the definitions set out below.

As used herein, the singular forms "a", "an," and "the" do not preclude plural referents, unless the content clearly dictates otherwise.

As used herein, the term "and/or" includes any and all combinations of one or more of the associated listed items.

As used herein, the term "about" when used in conjunction with a stated numerical value or range denotes somewhat more or somewhat less than the stated value or range, to within a range of ±10% of that stated.

The term "quantum dot" or "QD" as used herein refers to an inorganic semiconductor crystallite of about 1 nm or more and about 1000 nm or less in diameter or any integer or fraction of an integer therebetween, preferably at least about 2 nm and about 50 nm or less in diameter or any integer or fraction of an integer therebetween, more preferably at least about 2 nm and about 20 nm or less in diameter (for example about 2, 3, 4, 5, 6, 7, 8, 9, 10, 11, 12, 13, 14, 15, 16, 17, 18, 19, or 20 nm). QDs are characterized by their substantially uniform nanometer size, frequently exhibiting approximately a 10% to 15% polydispersion or range in size. A QD is capable of emitting electromagnetic radiation upon excitation (i.e., the QD is operable as a photon source) and includes a "core" of one or more first semiconductor materials, and may be surrounded by a "shell" of a second semiconductor material. A QD core surrounded by a semiconductor shell is referred to as a "core/shell" QD. The surrounding "shell" material will preferably have a bandgap energy that is larger than the bandgap energy of the core material and may be chosen to have an atomic spacing close to that of the "core" substrate.

A quantum dot core and/or shell can be a semiconductor material including, but not limited to, those of the groups II-VI (ZnS, ZnSe, ZnTe, US, CdSe, CdTe, HgS, HgSe, HgTe, MgS, MgSe, MgTe, CaS, CaSe, CaTe, SrS, SrSe, SrTe, BaS, BaSe, BaTe, and the like) and III-V (GaN, GaP, GaAs, GaSb, InN, InP, InAs, InSb, and the like) and IV (Ge, Si, and the like) materials, PbS, PbSe, and an alloy or a mixture thereof.

Overview

Local laser heating of a phase-change film in contact with quantum dots embedded in a photonic membrane structure results in tuning of the quantum dots. This technique is expected to apply to a wide variety of quantum dots to controllably tune them to have desired emission properties.

Quantum dots are embedded in photonic membrane structures (for example, photonic crystals and bridge waveguides) that can be integrated on-chip to form distributed networks. The diode structure of the membranes enables controlled charging of the QDs with either electrons or holes, which can be used to create spin qubits.

A focused laser is used to locally heat a thin film of a material that can undergo a phase transition (e.g. GeTe undergoes an amorphous to crystalline transition at about 150° to 270° C. while $HfO_2$ undergoes an amorphous to crystalline transition at ~400° C.) that is contact with the membrane structure containing the QDs. The phase transition results in a volume change and thus compressive strain under the affected area. By gradually converting the phase change materials with repeated exposures of the heating laser, a progressively larger strain can be applied, thus tuning the QD. Accordingly, a population of QDs in the membrane structure that starts with a variety of emission frequencies can be made to emit at the same frequency.

The tuning can be applied independently to individual quantum dots in the membrane structure (as compared to other techniques that might involve indiscriminate application to multiple QDs in a batch process without regard to their individual differences). In embodiments, the emission of an individual QD is measured between applications of the laser so that the laser is no longer applied to the QD once the QD is tuned to a desired emission profile.

The photonic membrane structure can be prepared using techniques known in the art, for example a combination of molecular beam epitaxy and e-beam lithography. The phase change film deposited on the structure is typically a thin film (about 2 to 100 nm thick) of a phase change material or other material that can exert strain when heated by the laser.

A laser is focused to a spot (for example of about 1 micron or larger diameter) on the film with a power sufficient to raise the temperature to induce a phase transition in the thin film. Repeated exposures will result in a larger area of the thin film to undergo a phase transition, resulting in progressively larger strain. The area affected by the laser can be controlled by increasing the 532 nm laser power (i.e. increasing the temperature), moving the laser with respect to the sample, or increasing the spot size of the 532 nm laser. All of these approaches allow a continuous increase in the area of converted film, which translates in to a continuous increase in compressive and tensile strain underneath and away from the converted region, respectively. The resulting piezoelectric potential changes the quantum dot emission frequency.

Figure 1A:
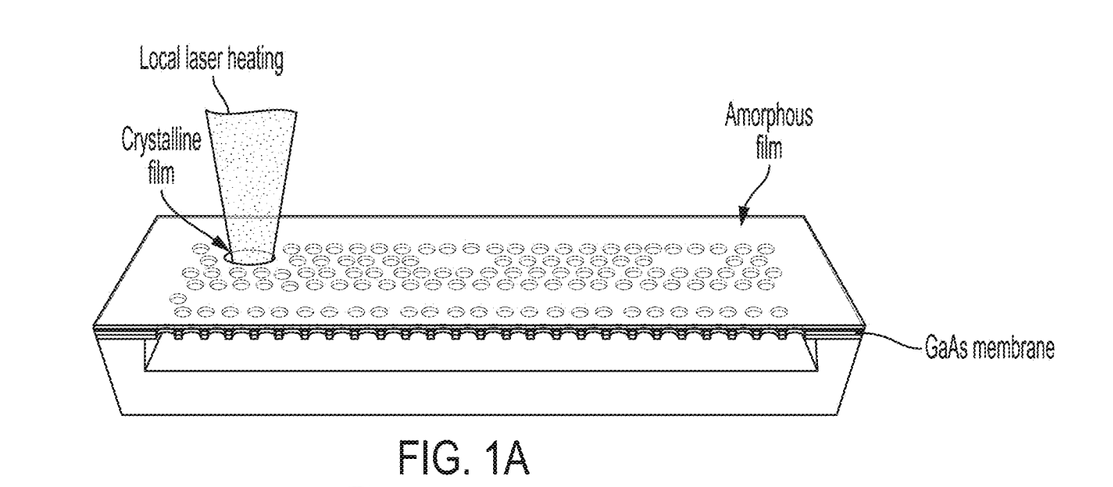
FIGS. 1A and 1B illustrate two embodiments of phase change film applied to a photonic membrane structure.
Figure 1B:
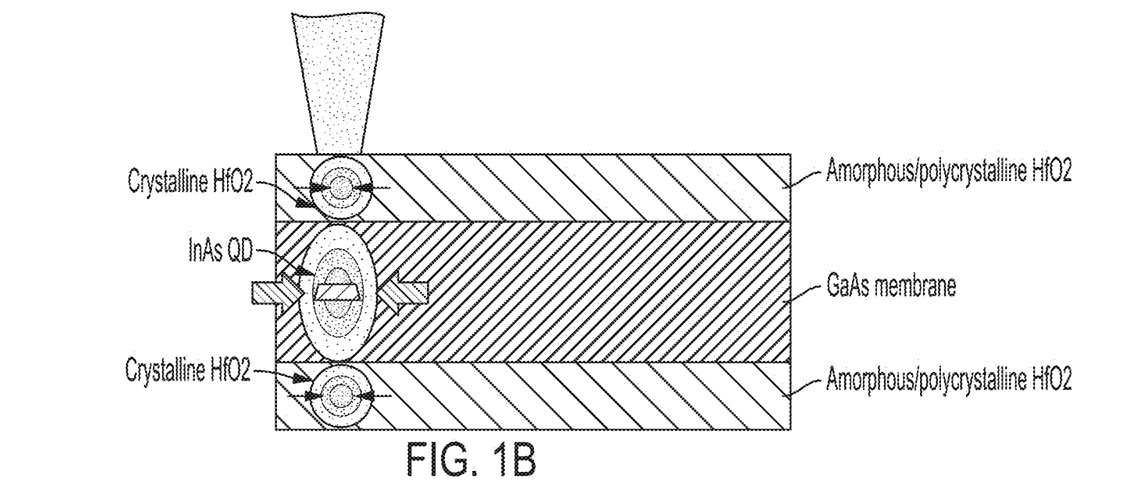

In embodiments, a phase change film is applied to one side of a photonic membrane structure (FIG. 1A) while other embodiments have the film on both sides of the structure (FIG. 1B). The film can be, for example, GeTe or $HfO_2$. In various embodiments the film can have a thickness of, by way of non-limiting example, 2 nm to 40 nm It was possible to shift the emission frequency of individual InAs quantum dots embedded in a GaAs membrane diode with spatial selectivity. A thin, amorphous layer of a phase change material (a GeTe with a thickness of less than 50 nm) was deposited on the surface of a ~180 nm GaAs membrane. Local heating with a 532 nm continuous wave (CW) laser induced local amorphous-to-crystalline phase transitions.

The reduction in GeTe volume upon crystallization laterally compressed the GaAs membrane underneath the converted region. With the GaAs membrane anchored on two or more sides, this results in a tensile strain in regions away from the crystallized GeTe.

Figure 2A:
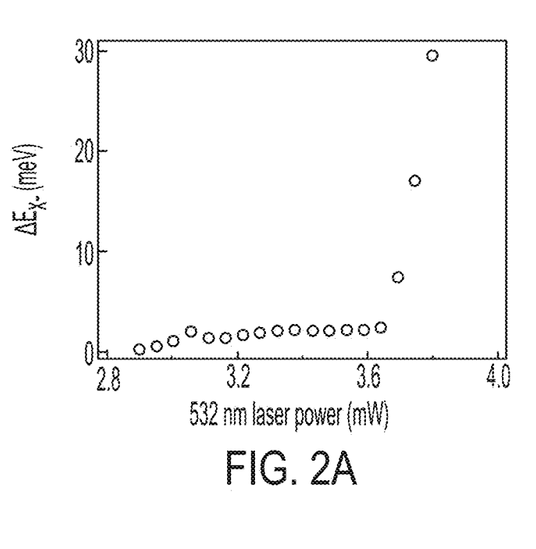
FIGS. 2A-2D illustrate quantum dot (QD) tuning.
Figure 2B:
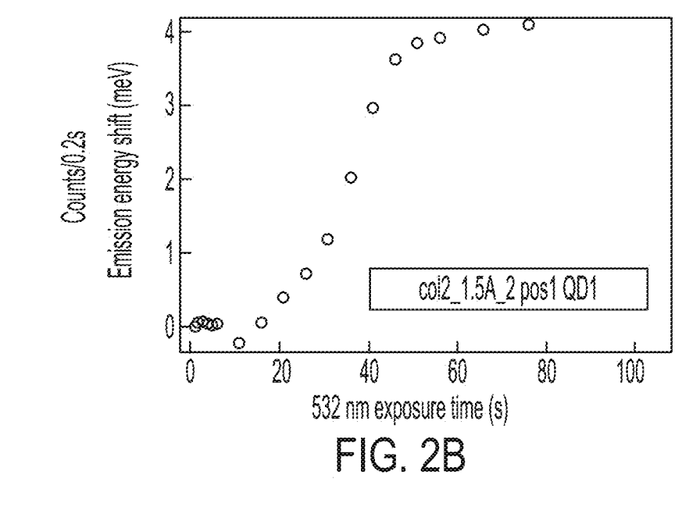
Figure 2C:
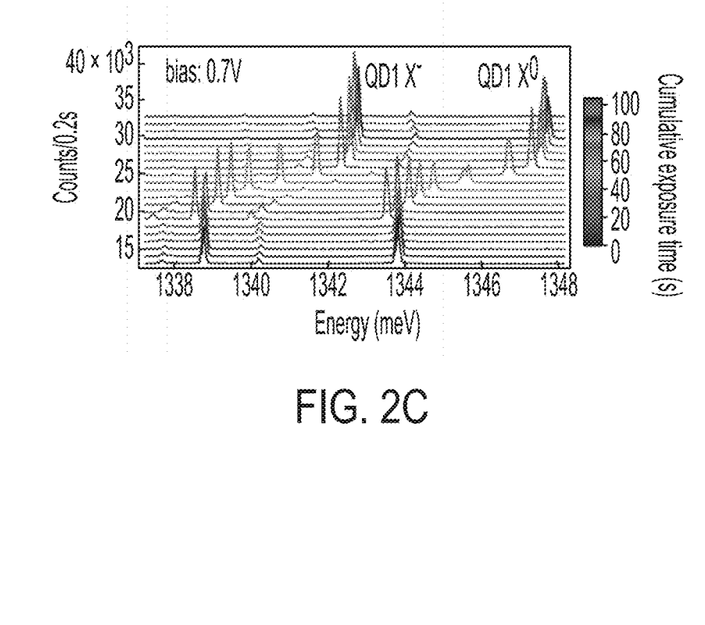

The data in FIG. 2A shows results of tuning the emission energy of a single QD in a 1.5 μm waveguide by increasing the heating laser power (the power was measured before the focusing objective), with the emission measured between heating laser exposures. It should be noted that the requisite laser power depends on the position on the waveguide, as well as the waveguide width. FIG. 2B shows the non-transient shift in emission energy for the negative trion of QD1 as a function of exposure time of a 532 nm C.W. laser. FIG. 2C shows spectra corresponding to this energy shift.

Figure 2D:
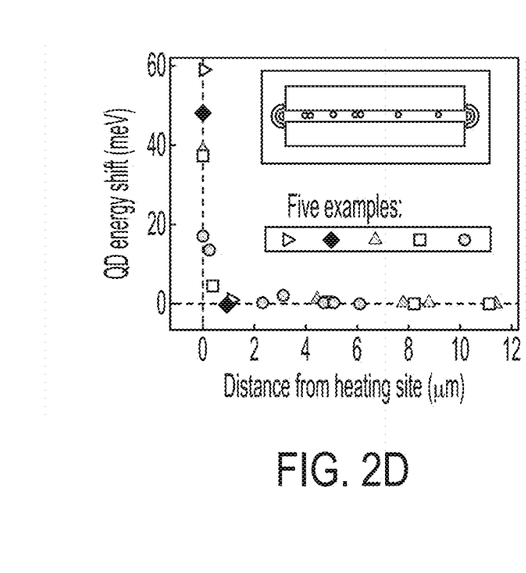

The spatial resolution of tuning is illustrated in FIG. 2D, with a plot of energy tuning as a function of distance from the laser-heated site. This was accomplished by recording the spectra of QDs located in different positions along a waveguide and then tuning the emission energy of a selected QD. The spectra of the other QDs were then re-measured. The relative position of each QD is determined by fitting to the intensity of the laser in optical images of the waveguide, with five different examples shown. The points in FIG. 2D indicate the change in the "bystander" QD peak emission energies after tuning a target QD. The QD positions were identified in optical images of the waveguide using the location of the probe laser at maximum QD emission intensity. The position of 0 μm corresponds to the location of a QD under the center of the heating laser, and the relative positions of the other QDs were recorded. For example, the points on the inset SEM correspond to QD positions for the data shown with circles in the plot. The left-most point corresponds to the position of a QD that was tuned 17 3 meV, after which the spectral shifts of the other QDs were recorded and plotted against their relative positions. Generally, very little shift was observed in QDs that are more than 1 μm from the center of the heating laser spot. In fact, in several instances a second QD was within the laser spot and shifted very little. For example, the first two square points in FIG. 2D show that the energy shift (37.25 meV) for a QD at the center of the heating laser spot is 8× greater than a QD<400 nm away (4.3 8 meV). Therefore, one can conclude that under appropriate conditions the spatial resolution can be 1 μm or less. It was found that the spatial resolution for photonic crystal waveguides is similar.

Figure 3:
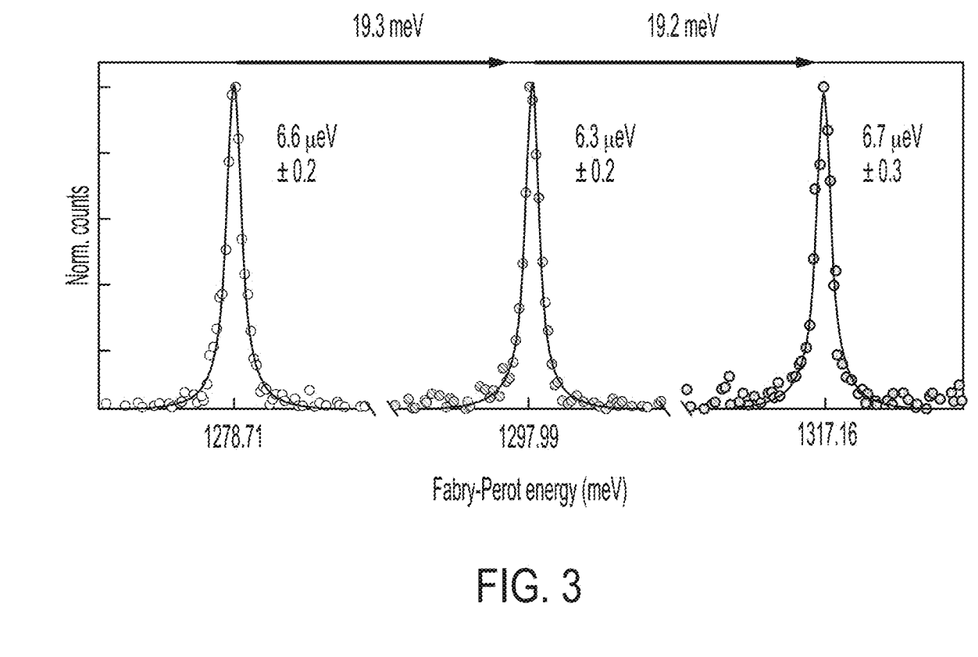
FIG. 3 shows the effect of tuning a single on QD linewidth.

The data in FIG. 3 shows a high-resolution spectrum of a single quantum dot prior to tuning and after two tuning steps. The linewidth remains unchanged, indicating that the tuning process was not detrimental to the optical properties of the quantum dot.

Figure 4:
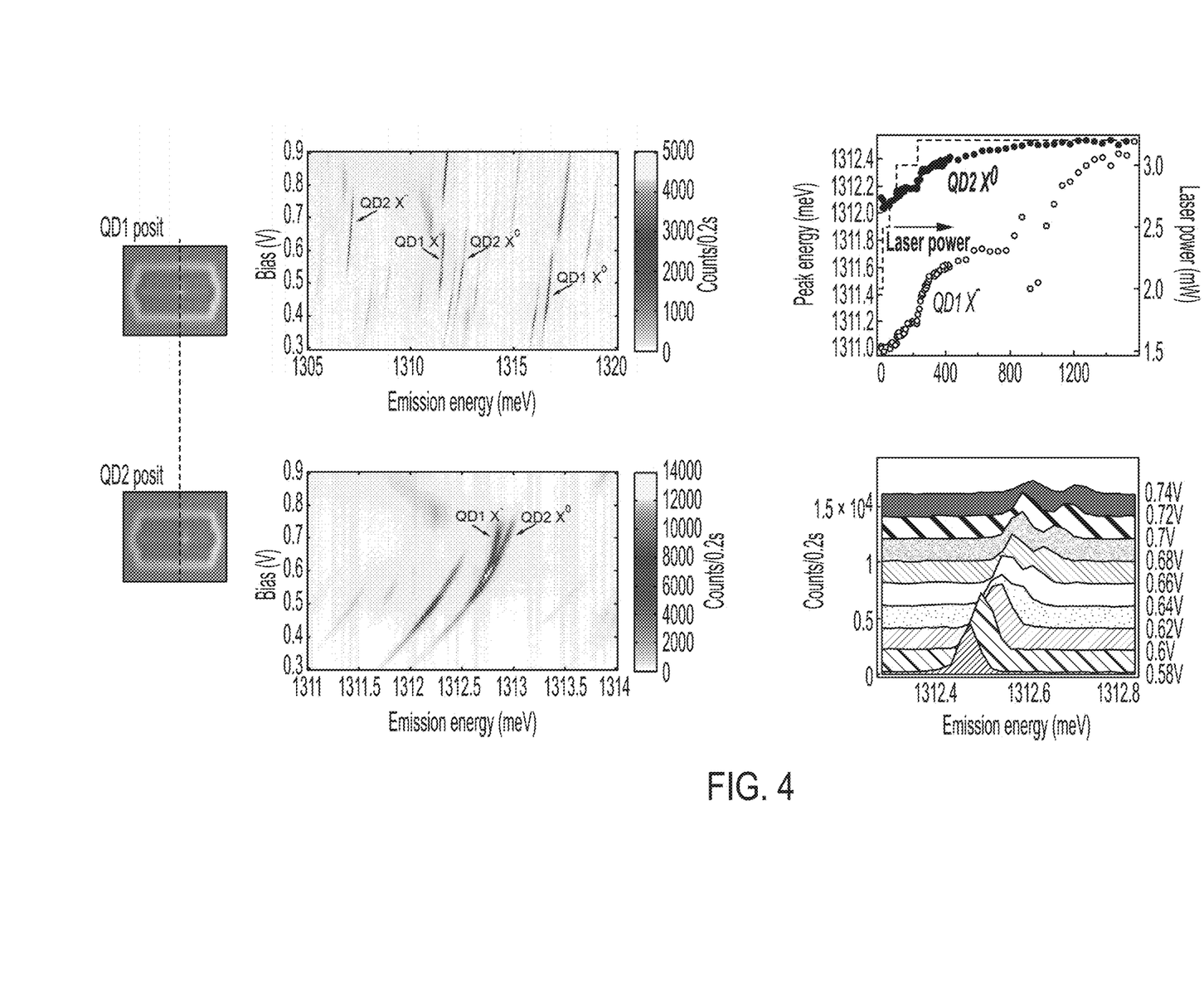
FIG. 4 shows the tuning of QDs into resonance in the same waveguide.

The data in FIG. 4 demonstrates the capability of independently tuning more than one quantum dot within the same photonic structure. This is shown by tuning two quantum dots into resonance that are <0.5 μm apart. This figure demonstrates that, in addition to long range tuning shown in FIG. 7, the tuning resolution is on the order of the quantum dot emission linewidth.

Figures 5, 6:
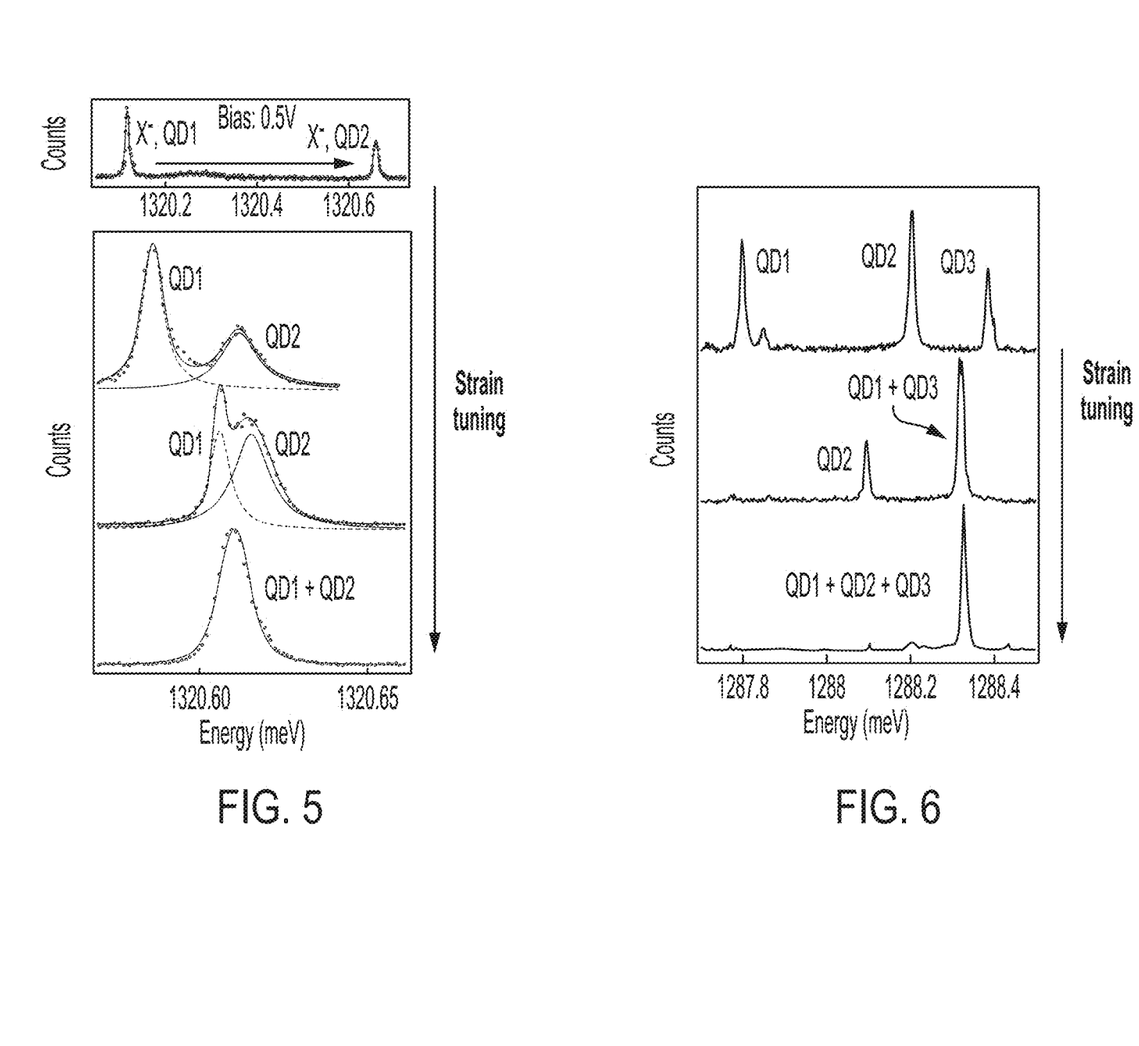
FIGS. 5 and 6 show the tuning of two and three QDs, respectively, into resonance in a single photon crystal waveguide.

The data in FIG. 5 provides an example of tuning two quantum dots within a single photonic crystal waveguide, while FIG. 6 shows how the technique was extended to three quantum dots also within a single photonic crystal waveguide.

Figure 7:
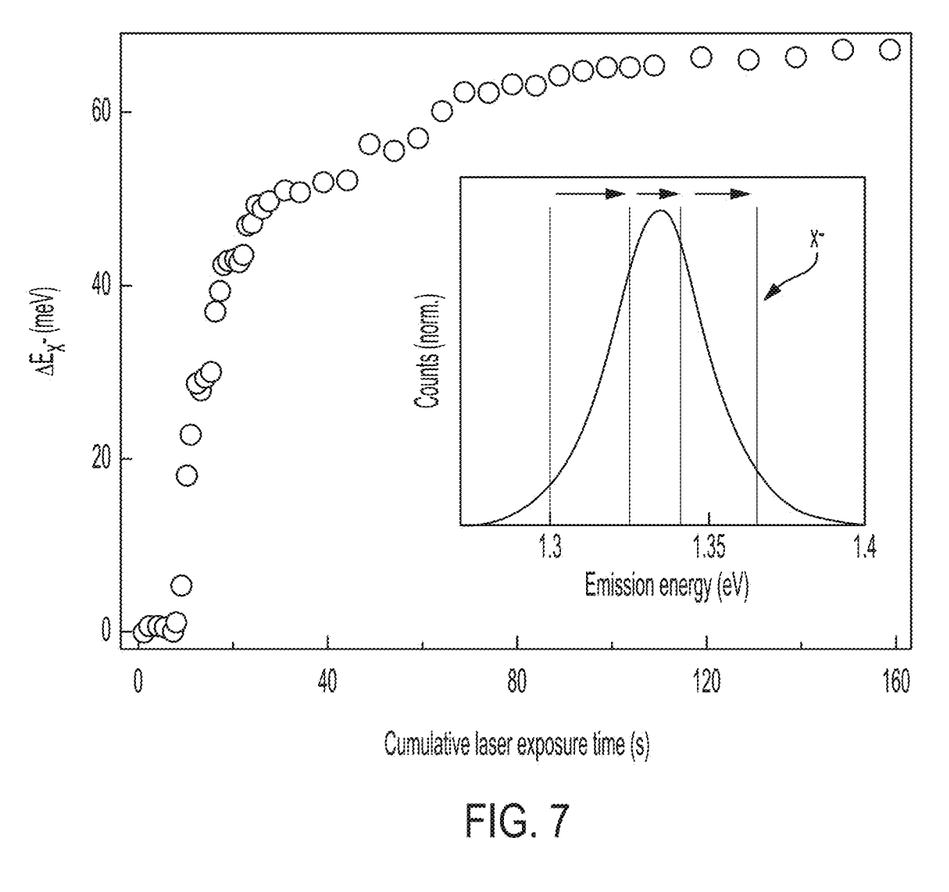
FIG. 7 illustrates the tuning range of this technique.

The data in FIG. 7 shows tuning of a single QD emission line over 65 meV. This is significantly greater than the typical inhomogeneous distribution of QD ensembles (the inset shows selected single QD spectra at various points along the tuning curve compared to a typical ensemble spectrum).

It is expected that this technique could be extended to other solid-state state quantum emitters in addition to quantum dots. Defects in diamond and silicon carbide are two prominent examples that have been integrated in similar photonic architectures and have been shown to be strain sensitive. Single emitters in two-dimensional transition metal dichalcogenides are yet another material class where this invention could be applied.

Advantages

The micro-laser processing technique can be performed in situ, which reduces the fabrication and processing overhead, and is expected to be operable on any type of quantum dot or other solid state emitter.

Frequency tuning is long range (>60 meV or >1200 GHz), permanent, and individual quantum dots can be tuned within the same membrane. Furthermore, the tuning is reversible: a crystalline to amorphous transition can be achieved by heating to ~700° C. and rapidly cooling, which can be accomplished with a sub-nanosecond laser pulse.

The diode structure of the membranes enables controlled charging of the QDs with either electrons or holes, which can be used to create spin qubits.

This technique addresses one of the most significant challenges facing solid state photonic networks, and should provide a path to scalable solid state quantum networks. This is believed to be the only technique to date that has been demonstrated to simultaneously accomplish (1) long range tuning over the full inhomogeneous QD linewidth (>60 meV), (2) spatial selectivity to allow tuning different QDs near each other in the same photonic membrane structure (<1 μm), and (3) a fine-tuning resolution (~1 μeV) to enable bringing QDs into mutual resonance.

CONCLUDING REMARKS

All documents mentioned herein are hereby incorporated by reference for the purpose of disclosing and describing the particular materials and methodologies for which the document was cited.

Although the present invention has been described in connection with preferred embodiments thereof, it will be appreciated by those skilled in the art that additions, deletions, modifications, and substitutions not specifically described may be made without departing from the spirit and scope of the invention. Terminology used herein should not be construed as being "means-plus-function" language unless the term "means" is expressly used in association therewith.

What is claimed is:

1. A method of tuning quantum emitters, comprising:
providing a photonic membrane diode comprising a plurality of solid-state quantum emitters;
depositing a film comprising $HfO_2$ on the photonic membrane diode, wherein the film undergoes a change in form upon heating; and
focusing a spot of laser light on the film with power sufficient to induce the change in form in the film,
wherein the change in form causes a strain in the photonic membrane diode and thereby a change in emission frequency of at least one of the plurality solid-state quantum emitters that persists without need for continuing application of the laser light, and
wherein the change in form comprises crystallization of the $HfO_2$.

2. The method of claim 1, wherein the solid-state quantum emitters are selected from the group consisting of quantum dots, diamond, silicon carbide, and transition metal dichalcogenides.

3. The method of claim 2, wherein the solid-state quantum emitters are quantum dots.

4. The method of claim 1, wherein the change in form causes a change in emission frequency of only a single solid-state quantum emitter.

5. The method of claim 1, further comprising a step of measuring the change in emission frequency and repeating the measuring and focusing steps as needed in order to tune the plurality of solid-state quantum emitters to have essentially a single emission frequency.

6. A method of tuning quantum emitters, comprising:
providing a photonic membrane diode comprising a plurality of solid-state quantum emitters and a film comprising $HfO_2$ overlaid on the photonic membrane diode, wherein the film undergoes a change in form upon heating;
focusing a spot of laser light on the film with power sufficient to induce the change in form in the film,
wherein the change in form causes a strain in the photonic membrane diode and thereby a change in emission frequency of at least one of the plurality solid-state quantum emitters that persists without need for continuing application of the laser light, and
wherein the change in form comprises crystallization of the $HfO_2$.

7. The method of claim 6, wherein the solid-state quantum emitters are selected from the group consisting of quantum dots, diamond, silicon carbide, and transition metal dichalcogenides.

8. The method of claim 7, wherein the solid-state quantum emitters are quantum dots.

9. The method of claim 6, wherein the change in form causes a change in emission frequency of only a single solid-state quantum emitter, and further comprising a step of measuring the change in emission frequency and repeating the measuring and focusing steps as needed in order to tune the plurality of solid-state quantum emitters to have essentially a single emission frequency.

* * * * *